US011639012B2

(12) United States Patent
Gonzalez Bohme et al.

(10) Patent No.: US 11,639,012 B2
(45) Date of Patent: May 2, 2023

(54) AUTOMATIC FORMWORK SYSTEM AND METHOD FOR FLEXIBLE ELASTIC MEMBRANE MOULDS

(71) Applicant: Universidad Tecnica Federico Santa Maria, Valparaiso (CL)

(72) Inventors: Luis Felipe Gonzalez Bohme, Valparaiso (CL); Cristian Javier Calvo Barentin, Valparaiso (CL)

(73) Assignee: UNIVERSIDAD TECNICA FEDERICO SANTA MARIA, Valparaiso (CL)

(*) Notice: Subject to any disclaimer, the term of this patent is extended or adjusted under 35 U.S.C. 154(b) by 368 days.

(21) Appl. No.: 16/960,997

(22) PCT Filed: Jan. 11, 2018

(86) PCT No.: PCT/CL2018/050003
§ 371 (c)(1),
(2) Date: Jul. 31, 2020

(87) PCT Pub. No.: WO2019/136569
PCT Pub. Date: Jul. 18, 2019

(65) Prior Publication Data
US 2020/0353644 A1    Nov. 12, 2020

(51) Int. Cl.
*B28B 7/02*    (2006.01)
*B28B 1/14*    (2006.01)

(52) U.S. Cl.
CPC . *B28B 7/02* (2013.01); *B28B 1/14* (2013.01)

(58) Field of Classification Search
CPC ......... B28B 7/02; B29C 33/38; B29C 33/301; B29C 33/307; B29C 3/44; B29C 33/50
See application file for complete search history.

(56) References Cited

U.S. PATENT DOCUMENTS 5,213,732 A   5/1993  Jevtic
5,330,343 A   7/1994  Berteau
(Continued)

FOREIGN PATENT DOCUMENTS

CN    104985674 A  *  10/2015
CN    104985674 A     10/2015
(Continued)

OTHER PUBLICATIONS

Mainhard Hidalgo, Max.; International Search Report and Written Opinion of the International Searching Authority, issued in International Application No. PCT/CL2018/050003; dated Oct. 4, 2018; 24 pages including English translations.

*Primary Examiner* — Kelly M Gambetta
*Assistant Examiner* — Virak Nguon
(74) *Attorney, Agent, or Firm* — Ulmer & Berne LLP

(57) ABSTRACT

Flexible molds have an elastic membrane supported by modules, arranged next to one another along a horizontal longitudinal axis of the mold. Each module has traction units, each forming a respective group with a respective thrust unit, with the groups arranged opposite one another at a preset distance. Pairs of traction units are arranged opposite one another in a direction perpendicular to the axis, and the respective thrust units thereof are arranged therebetween. The modules hold the membrane with the mold via reinforced eyelets distributed on both edges parallel to the axis. Each traction unit has linear actuators arranged horizontally and another linear actuator arranged vertically, which together enable movement. The membrane is previously deformed according to an approximation of the prior design of a part to be molded, and prestressed according to a mathematical prediction of the deformation thereof after receiving a conglomerate in liquid or plastic state.

21 Claims, 11 Drawing Sheets

(56) References Cited

U.S. PATENT DOCUMENTS

| | | |
|---|---|---|
| 2008/0029685 A1 | 2/2008 | West |
| 2013/0299084 A1 | 11/2013 | Kristensen et al. |
| 2016/0046038 A1 | 2/2016 | Ruthrauff |
| 2017/0133137 A1 | 5/2017 | Khan et al. |

FOREIGN PATENT DOCUMENTS

| | | | |
|---|---|---|---|
| JP | H07-304017 A | | 11/1995 |
| JP | 08164513 A | * | 6/1996 |
| JP | H08-164513 A | | 6/1996 |
| WO | 2006048652 A1 | | 5/2006 |

\* cited by examiner

AUTOMATIC FORMWORK SYSTEM AND METHOD FOR FLEXIBLE ELASTIC MEMBRANE MOULDS

FIELD OF APPLICATION

The present invention refers to an automatic formwork system and method for flexible elastic membrane molds intended for the serial molding of parts of concrete or another similar material for components of a building, urban furniture, sculptures or others. More specifically to a formwork system with a motorized mechanical support that can be numerically controlled to guarantee precision and repeatability in the physical configuration of the geometry of a flexible elastic membrane mold or the like in order to shape a conglomerate in liquid or plastic state according to a previous computer design and that enables the emptying of the conglomerate and the demolding of the resulting part easy.

DESCRIPTION OF THE PRIOR ART

A formwork system is a structure intended to contain and shape a finite quantity of either an agglomerate or conglomerate in liquid or plastic state while progressively hardening and being properly composed of two complementary devices: the mold and the supporting apparatus. In general, two types of formwork system can be distinguished according to their mode of installation and primary purpose: transitory, on site, to mold parts in their final position, and stationary, in the factory or also on site, for the prefabrication of parts, which will then be arranged in a different place from where they were molded.

In a formwork system, the mold is actually the container whose interior shape will be adopted by the paste or mass in liquid or plastic state of an agglomerate or conglomerate after being poured into the mold and progressively hardening within it. In general, two kinds of mold can be distinguished according to the mechanical properties of the material from which the mold is made: rigid and flexible. Among the types of flexible mold that can be used to mold large concrete or similar parts such as components of a building, urban furniture, sculptures or others, we have the elastic membranes that can be made of woven and non-woven fabric or other material with similar mechanical properties. The flexible molding with an elastic membrane allows obtaining sinuous smooth and continuous surface shapes, also called organic, with less effort than using a rigid mold. The construction of the supporting apparatus, as well as fastening and fixing of the fabric are all relatively simple and low cost operations in terms of time and materials required.

The easiest and most direct way to mold concrete or another similar material with flexible elastic membrane molds to produce elongated volumes, such as beams, columns, benches or others, is by using the action exerted by force of gravity on the conglomerate itself, deforming the elastic membrane serving as a mold. The control of the membrane contour is an essential part of this technique. In general, a rectangular-shaped fabric is used, the contour of which can be constituted by rigid or flexible edges. In textile structure, a rigid edge can be achieved in at least three ways: (i) by a continuous perimeter fixing of the fabric edge to the supporting apparatus directly, (ii) through a high flexural rigidity bar or tube introduced through a fold sewn along the edge of the fabric, which is discretely attached to the supporting apparatus and (iii) through a high flexural rigidity bar or tube around which a cord is helically wound through a plurality of grommets (reinforced eyelets) arranged along the edge of the fabric in order to attach it, which is discretely attached to the supporting apparatus.

In general, the main objectives of the elastic membrane molding of concrete parts or another similar material are to produce unique parts of high aesthetic, architectural and sculptural value; the sole purpose of the supporting apparatus is holding the fabric in a fixed position when pouring the conglomerate until hardening. The use of automatic systems to configure flexible molds through actuators refers to laboratory experiments, wherein a plurality of motors are used that push a plurality of pistons located under the flexible mold in order to specify their position on the vertical axis Z. This only works for laminar parts, that is, only one face of the part can be molded.

The patent application US2008029685 (A1), dated 7 Feb. 2008, titled "Method of casting a concrete truss", by West, describes a three-dimensional, variable section apparatus having a high level of dimensional control for casting molds, the apparatus having two flat sheets of flexible material (such as fabric), which are held in place by rigid clamps. The fastening materials control the shape and dimension of the mold in the X and Y directions, while the flexible sheets are allowed to deflect in the Z direction. Casting forms can be obtained when the fastening material presses the two sheets together.

The invention patent U.S. Pat. No. 5,213,732 dated May 25, 1993, titled "Method of casting materials using a flexible resilient mold", by Jevtic, describes a mold system based on a flexible bag-shaped membrane supported and immobilized by a complementary support, which can be a rigid mold optionally. In the latter case, the rigid mold confines the membrane inside, the latter adopting the geometry of the former in an approximate way when filled.

The patent application US2013299084 A1, dated Nov. 14, 2013, titled "Flexible mat for providing a dynamically reconfigurable double-curved moulding surface in a mould", by Kristensen, describes an apparatus that allows reconfiguring a multilayer sheet support for flexible molds, by controlling it with actuators and a controller. This allows this surface to quickly adapt to complex double curvature geometries from the information provided by a model defined using CAD tools.

In the state of the art, there is no formwork system composed of an automatic supporting apparatus that allows the geometry of a flexible elastic membrane mold to be configured by numerical control, modifying the internal stresses of the mold and rectifying the geometry of the mold once loaded with the material to be molded, to precast concrete parts or a similar material according to a previous computer design. The use of flexible fabric molds is still artisanal and, therefore, prefabricating serial parts with sinuous shapes of smooth and continuous surfaces, with high quality and dimensional accuracy is not possible yet.

SUMMARY OF THE INVENTION

A first objective of the invention is proposed, which comprises an automatic formwork system using flexible molds, comprising: an elastic membrane supported by a plurality of supporting modules, arranged side by side, along a horizontal longitudinal axis or X axis, of a flexible mold or part to be molded; wherein each supporting module is composed of a first traction unit forming a group with a first thrust unit and a second traction unit forming a group with a second thrust unit, wherein both groups are arranged opposite each other and at a preset convenient distance;

wherein each pair of traction units are arranged opposite each other, in a direction perpendicular to the X axis and between them they are arranged with their respective thrust units; wherein the group of supporting modules holds an elastic membrane mold with the flexible mold, which is held by reinforced eyelets distributed on both edges parallel to the horizontal longitudinal axis of the flexible mold; wherein each of the traction units is composed of a first linear actuator and the second linear actuator horizontally arranged and a third linear actuator vertically arranged, the three linear actuators enabling movement in their respective positions on a horizontal sliding platform; and wherein the elastic membrane is previously deformed according to an approximation to the previous design of a part to be molded, and prestressed according to a mathematical prediction of its deformation after receiving a conglomerate in liquid or plastic state.

Furthermore, a second objective of the invention is proposed, which comprises a method for automatic formwork using flexible molds, comprising an automatic formwork system using flexible molds, according to the first objective of the invention; which describes the stages of:

- Distancing a pair of linear actuators from each thrust unit each other, until reaching the minimum necessary distance according to the maximum width of the part to be molded and a predictive numerical model, taking into account the maximum transverse stress applied to the elastic membrane;
- Raising a pair of rollers of each thrust unit, until reaching the minimum necessary height according to the maximum height of the part to be molded and the predictive numerical model, taking into account the maximum transverse stress applied to the elastic membrane;
- Raising all the hooks of each traction unit, until reaching the same height as the rollers, which corresponds to the minimum necessary height according to the maximum height of the part to be molded and the predictive numerical model, taking into account the transverse maximum stress applied to the elastic membrane;
- Bringing all the facing traction units in each supporting module together, with their hooks in maximum horizontal extension, until reaching a preset convenient distance that allows the reinforced eyelets of the flexible elastic membrane mold to be engaged along their entire length according to the length of the part to be molded itself;
- Once the flexible elastic membrane mold has been engaged on its two longitudinal edges, distance the linear actuators pair of facing traction units in each supporting module, prestressing the flexible elastic membrane mold and approaching as much as possible the shape predicted by the previous numerical model;
- Once the process of prestressing the elastic membrane and the optional installation of reinforcement is completed, the mix of liquid or plastic conglomerate is poured onto the elastic membrane until reaching the predefined filling level;
- From the initial deformation of the elastic membrane and in the period during which the conglomerate is still in liquid or plastic state, the difference between the real and the predefined theoretical deformation is measured to modify the transverse stresses and thus correct the difference measured; and wherein this process is repeatedly carried out until reaching a measured difference lower than a predefined tolerance; and
- Once the molded part is cured, the stress is increased in all its cross sections, thus facilitating the detachment of the elastic membrane from the molded part, while being lifted and removed from the automatic formwork system.

DESCRIPTION OF A PREFERRED EMBODIMENT

Figure 1:
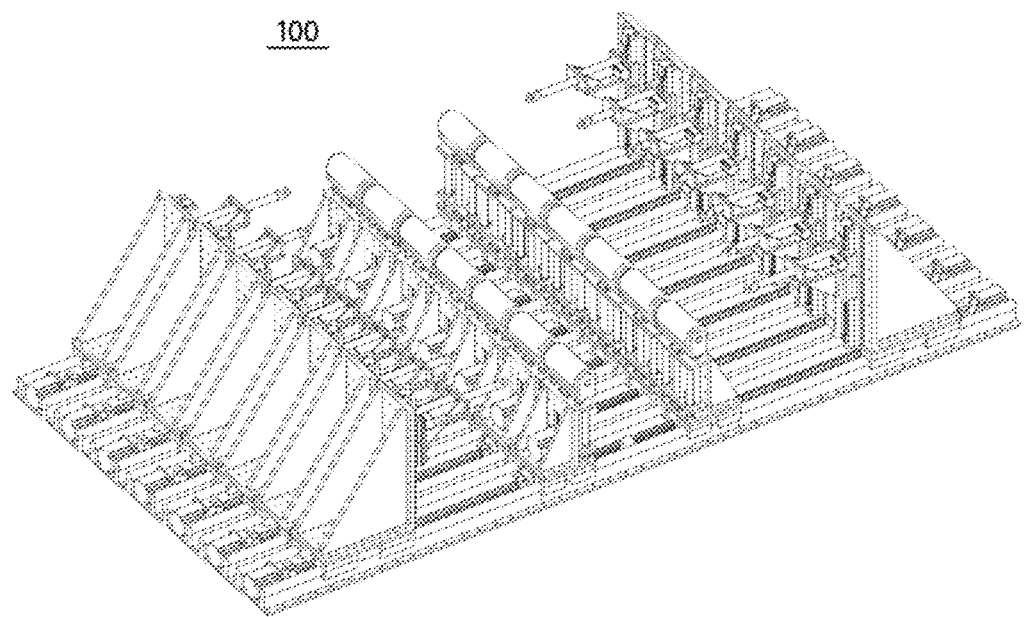
FIG. 1 shows a main isometric view of the supporting apparatus of the invention's automatic formwork system.

The objective of the invention is to have an automatic supporting apparatus for flexible, modular, mechanical, motorized elastic membrane molds, whose physical spatial configuration is programable by numerical control from a computer according to a previous design carried out in a CAD/CAM application program or similar, and reconfigurable in real time with numerical methods, by successive rectifications of the mold shape loaded with the conglomerate, in order to guarantee precision and repeatability in the execution of the same model of each molded part.

The supporting apparatus is the main physical component of the automatic formwork system proposed herein. The supporting apparatus itself is a modular, extensible and scalable system made up of a plurality of supporting modules arranged side by side, along the mold's horizontal longitudinal axis or X axis and that act by traction the mold in two opposite directions, in the direction of the mold's horizontal transverse axis or Y axis and thrust the mold by means of two linear supports in the direction of the mold's vertical axis or Z axis. Each supporting module itself is made up of two electromechanical units traction the mold and one to push it, the three units being arranged in a collinear manner, conveniently spaced each other, with the mold's vertical thrust unit arranged between both horizontal mold traction units; all with size and robustness to be defined according to specifications to properly resist the forces to which the automatic formwork system will be subject in its final industrial application.

Each traction unit itself is an electromechanical system made up of two linear actuators arranged in the horizontal direction and one in the vertical direction. On the sliding platform of a first linear actuator of the linear slider type, which can be anchored to the ground, a second linear slider is mounted in the vertical direction and on the sliding platform of the latter a linear actuator of the cylinder or stem type is mounted horizontally, with a hook mounted to the end of its stem. The actuators that make up this system are mounted and stiffened by means of L-shaped brackets and gussets. Both linear sliders can be composed of a screw nut or a toothed belt or a rack driving the linear advance in two directions of a sliding platform mounted by linear bearings on a group of guides or axles with rail for heavy load that can have continuous or discrete support. The stem actuator is made up of a stem whose advancement mechanism can be electric, hydraulic, or pneumatic, having a hook to pull the mold at its end. Each actuator is powered by an electric motor electronically controlled, to rotate and accelerate in both directions in a controlled way, which can be a servo motor, a stepper motor, or the like, with the required force as specified, optionally with hydraulic or pneumatic boost. The three linear actuators can have selfblocking mechanisms, so that to hold the mold stressed in a fixed position when pouring the conglomerate and until hardening when the motor stops and while being turned off.

In each supporting module, the purpose of a first linear slider arranged in a horizontal direction in each of a pair of traction units, is to approximate both traction units to the minimum horizontal distance required between them, considering the width of the part to mold. The purpose of a second linear slider, mounted in the vertical direction on the first linear slider, in each of a pair of traction units, is to approximate the stem actuator to the minimum vertical distance required between the ground and the top edge of the mold, considering the height of the part to be molded. The purpose of the stem actuator mounted in the horizontal direction on the second linear slider in each of a pair of traction units, is to stress the flexible elastic membrane mold using the hook mounted on the end of its stem, which engages one of a series of reinforced eyelets arranged on the longitudinal edges of the mold.

Each thrust unit itself is an electromechanical system made up by a linear actuator of the dual linear slider type, which has two sliding platforms simultaneously advancing towards the center or in opposite directions towards the ends, arranged in a horizontal direction and which can be anchored to the ground, and two lift-type stem actuators (such as the Welker Compact Lifter™), each mounted on one of the two sliding platforms of the dual linear slider. The actuators that make up this system are mounted and stiffened by means of L-shaped brackets and gussets. The dual linear slider may be comprised of a screw nut with bidirectional thread or another mechanism that drives the simultaneous movement of a pair of twin sliding platforms approaching or moving away from each other, mounted by linear bearings on a group of guides or axles with rail for heavy load that can have continuous or discrete support. Each of the two lifting actuators is made up of a stem whose advancement mechanism can be electric, hydraulic, or pneumatic, in addition to a group of guides or fixed axes and another of guides that move in a vertical direction accompanying the stem and which in its upper end pushes a plate with two branches that support the axis of a fixed pulley of the roller type.

In each thrust unit, the purpose of the dual linear slider is to keep the symmetry of the mold with respect to its horizontal longitudinal axis, in order to facilitate the formation of a straight longitudinal axis for the mold, in the successive arrangement of a series of adjoining thrust units, as well as making up two longitudinal edges parallel each other and preventing the elastic membrane mold from wrinkling when stressed. The purpose of the pair of twin lift actuators is to approximate the pair of twin rollers to the minimum vertical distance required between the ground and the top edge of the mold, considering the height of the part to be molded. The purpose of the pair of rollers is to facilitate the sliding of the elastic membrane when being stressed by the pair of traction units that make up each supporting module. The fundamental purpose of a series of thrust units, taken together, is to allow the molding of parts with at least two straight horizontal edges on both opposite sides of one face of the molding, which would otherwise acquire a sinuous shape, especially if the membrane that serves as a mold is not rolled at its longitudinal edges. Each actuator of the thrust unit is powered by an electric motor electronically controlled in order to rotate and accelerate in both directions, which can be a servo motor, a stepper motor, or the like, with the required force according to specifications, optionally with hydraulic or pneumatic boost. The dual linear slider and the two lift actuators can have sellblocking mechanisms, so that to hold the stressed mold in a fixed position when the conglomerate is poured and until hardening when the motor stops and while being turned off.

To carry out the molding process a part by numerical control, there are several numerical methods to predict the deformation of an elastic membrane subject to gravitational loads. In this case, the pressure exerted by the conglomerate in liquid or plastic state must also be taken into consideration. To predict the deformation of the flexible mold, the dynamic relaxation method can be used, based on the discretization of a continuum, from the concentration of portions of the total mass in nodes or sections and defining the relationship between nodes or sections in terms of rigidity.

In this case, the elastic membrane is divided into cross sections and then each of these is analyzed according to the distance between the supports, the length of the membrane section, its stiffness and the pressure the conglomerate would exert in liquid or plastic state according to the height defined by the previous design. According to these parameters, the membrane prestress throughout the analyzed section is calculated. Although this method is effective, it should always be borne in mind that there are small inaccuracies arising both from errors in the preparation of the conglomerate, and from small deformations of the support and the membrane as a result of imperfections in the material and the manufacturing process thereof. To correct this, having a sensor system capable of measuring the deformation of each section in real time is necessary, and then calculating the difference between the current and the desired deformation. Based on this difference, the transverse stresses are modified to correct the geometry of the mold, once the liquid conglomerate has been poured into the elastic membrane.

Description of the Constructive Aspects of the Molding System

Figure 2:
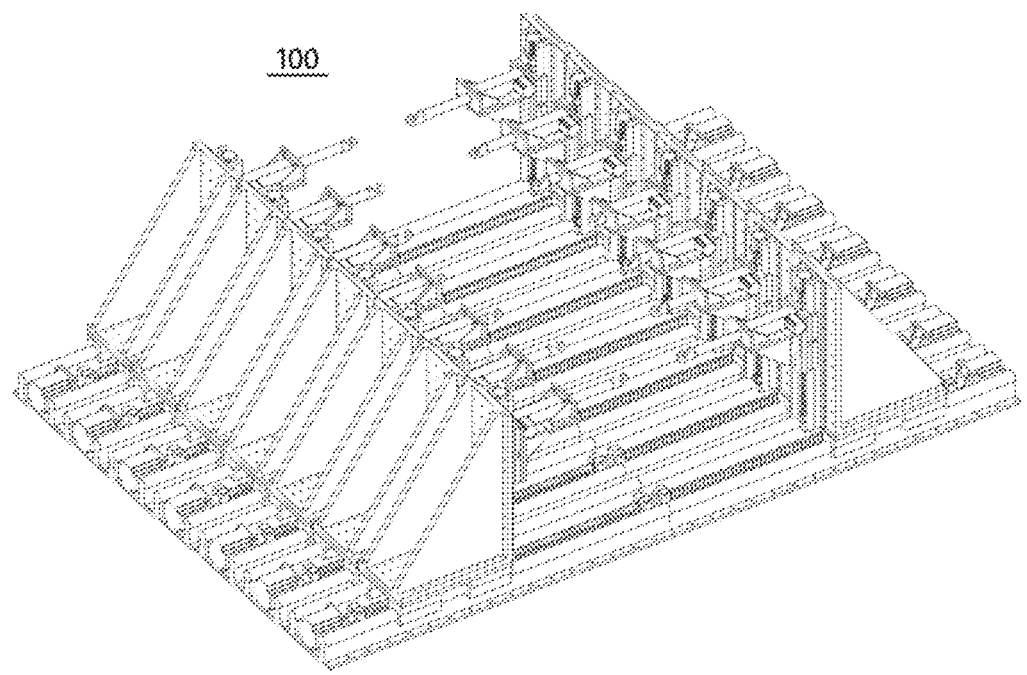
FIG. 2 shows a main isometric view of the supporting apparatus of the invention's automatic formwork system, without thrust units.
Figure 3:
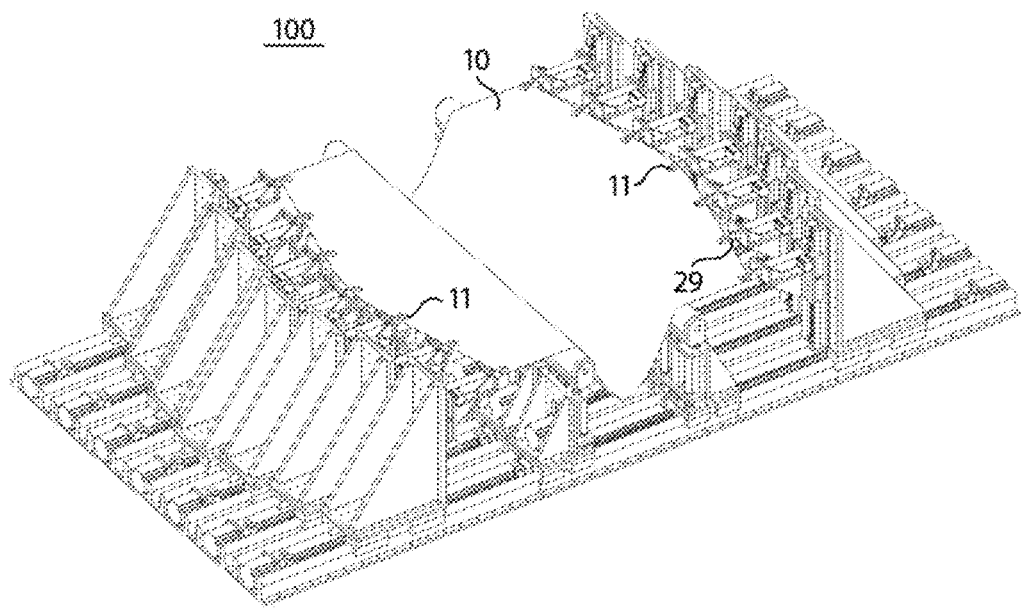
FIG. 3 shows a main isometric view of the invention's automatic formwork system, with a canvas for a flexible mold in an initial laying stage.
Figure 4:
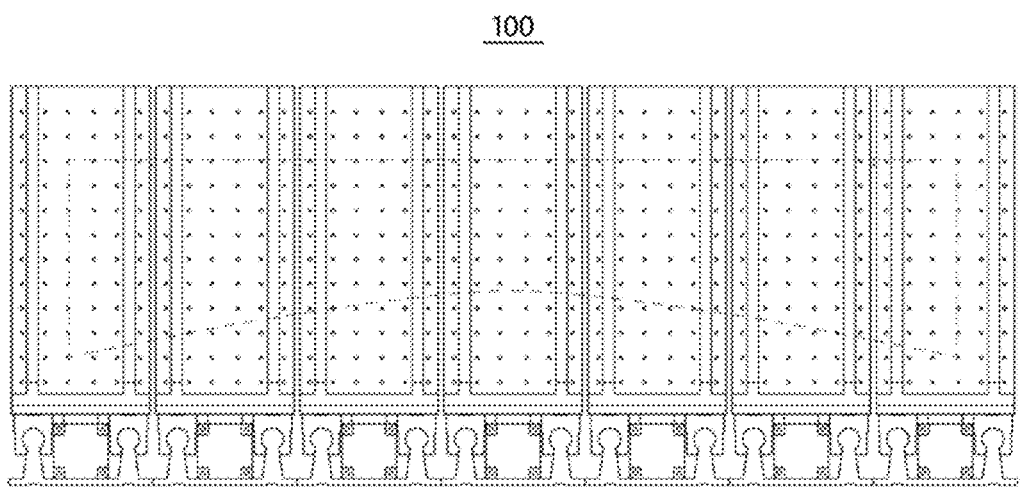
FIG. 4 shows a side view of the invention's automatic formwork system of FIG. 3.
Figure 5:
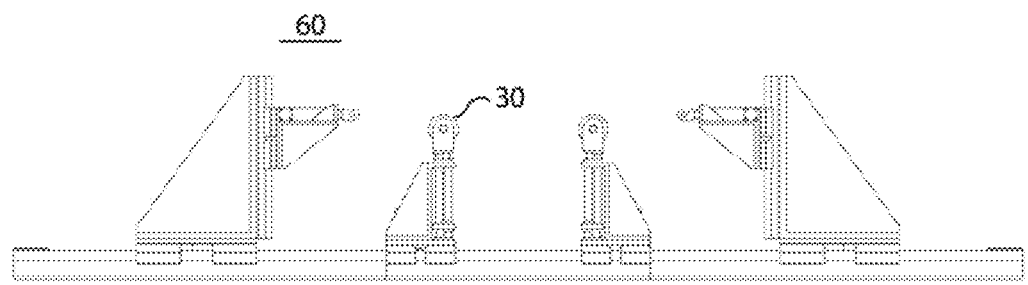
FIG. 5 shows a front view of the supporting apparatus of the invention's automatic formwork system of FIG. 1.
Figure 6:
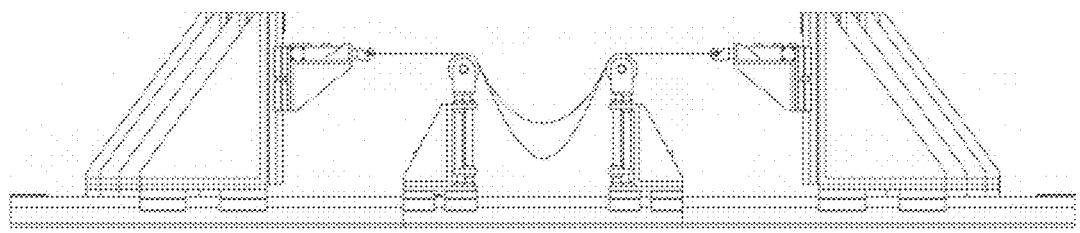
FIG. 6 shows a front view of the invention's automatic formwork system of FIG. 3.
Figure 11:
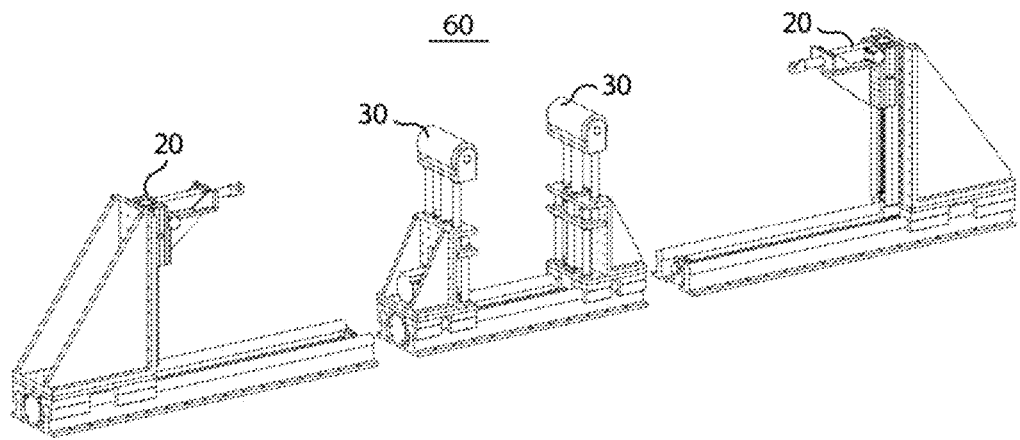
FIG. 11 describes a supporting module.
Figure 12:
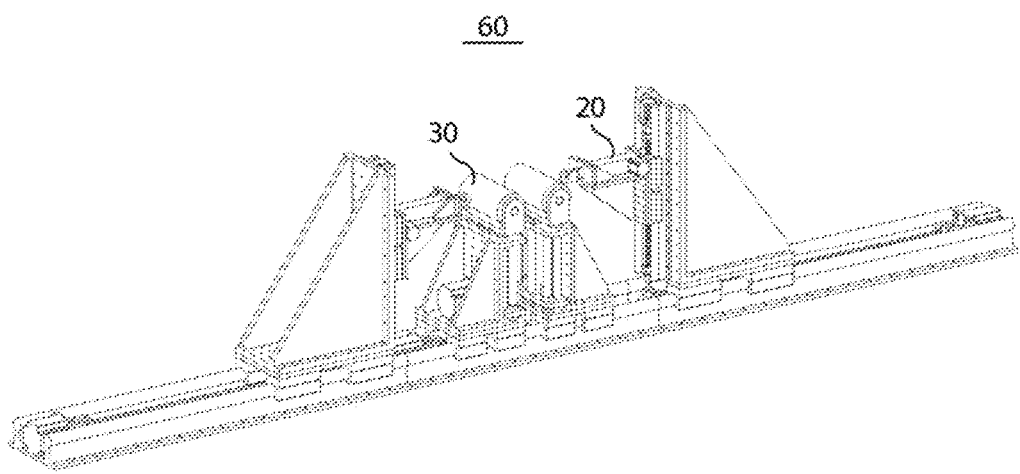
FIG. 12 describes a first operation option of the invention's automatic formwork system.
Figure 13:
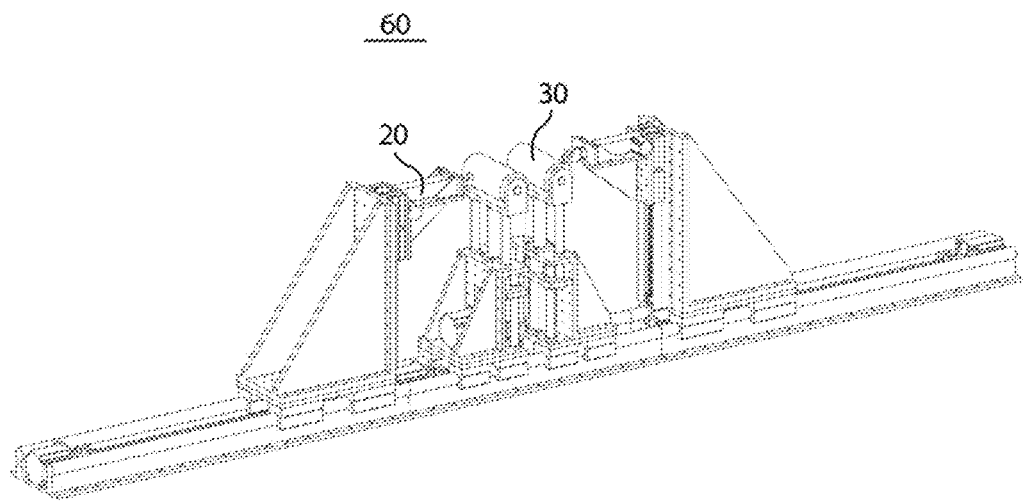
FIG. 13 describes a second option of operation of the invention's automatic formwork system.
Figure 14:
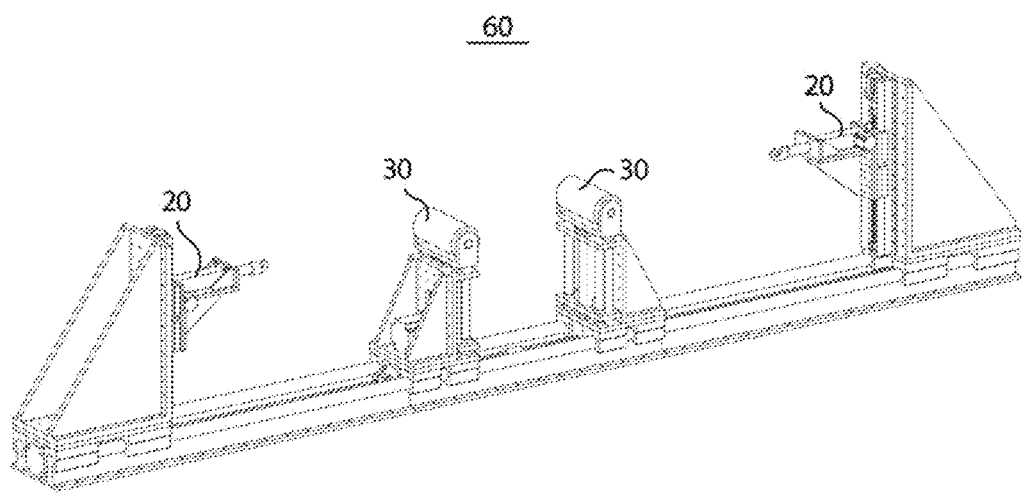
FIG. 14 describes a third option of operation of the invention's automatic formwork system.
Figure 15:
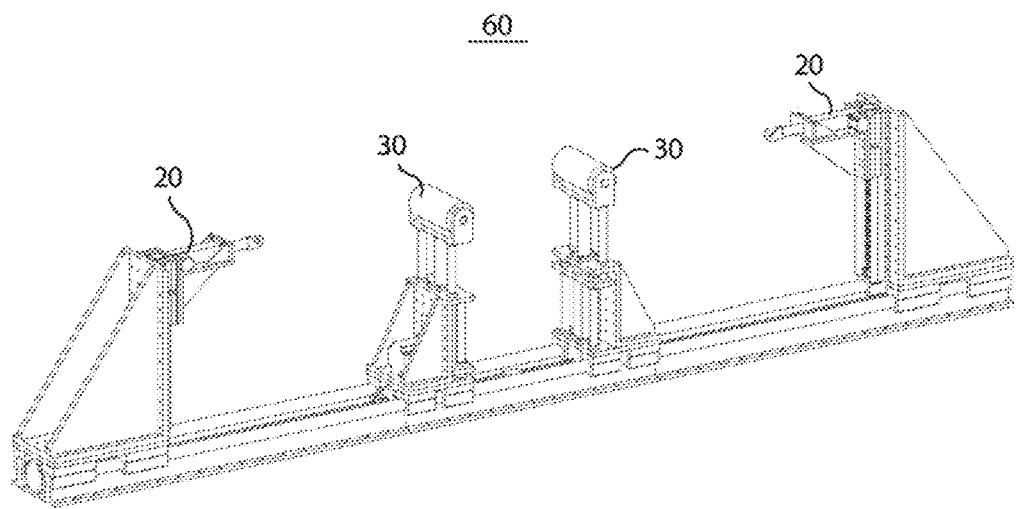
FIG. 15 describes a fourth option of operation of the invention's automatic formwork system.

The automatic formwork system (100), mainly shown in FIGS. 1 to 3, consists of a plurality of supporting modules (60) arranged next to each other, along the mold's horizontal longitudinal axis or X axis. In FIG. 11, the supporting module (60) is described as composed of a first traction unit (20) forming a group with a first thrust unit (30) and a second traction unit (20) forming a group with a second thrust unit (30), wherein both groups are arranged opposite each other and at a preset convenient distance. Each pair of traction units (20) is arranged opposite each other, in a direction perpendicular to the X axis and between them they are arranged with their respective thrust units (30); FIG. 12 describes a first option of minimum extension in the vertical and horizontal direction of the traction (20) and thrust (30) units that make up the supporting module (60) for the operation of the automatic formwork system (100); FIG. 13 describes a second option of maximum and minimum extension in the vertical and horizontal directions, respectively, of the traction (20) and thrust (30) units that make up the supporting module (60) of the automatic formwork system (100); FIG. 14 describes a third option of minimum and maximum extension in vertical and horizontal direction, respectively, of the traction (20) and thrust (30) units that make up the supporting module (60) of the automatic formwork system (100); FIG. 15 describes a fourth option of maximum extension in vertical and horizontal direction of the traction (20) and thrust (30) units that make up the supporting module (60) of the automatic formwork system (100).

Figure 7:
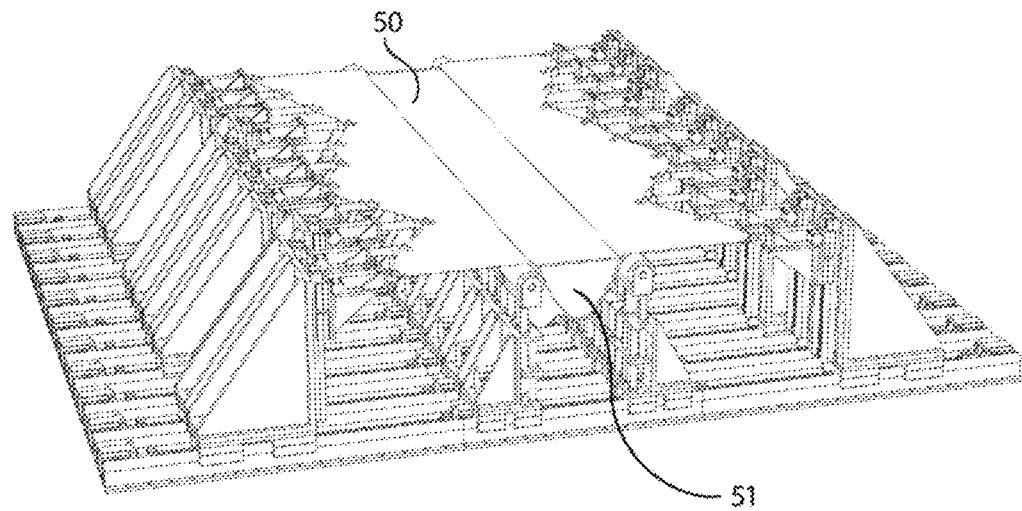
FIG. 7 describes a main isometric view of the invention's automatic formwork system in a first embodiment, molding a part with two straight edges.
Figure 8:
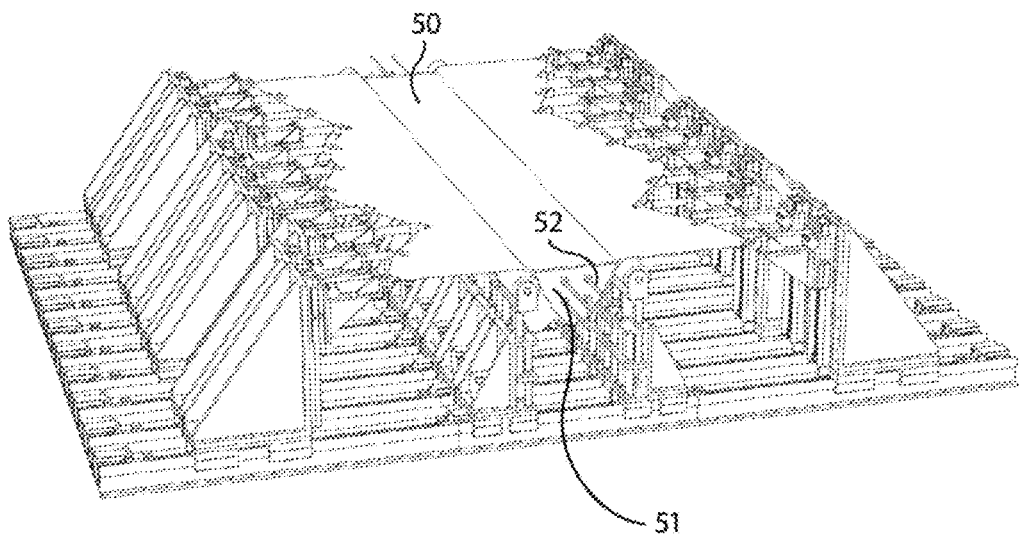
FIG. 8 shows a main isometric view of the invention's automatic formwork system in a second embodiment, molding a part with reinforcing bars.
Figure 9:
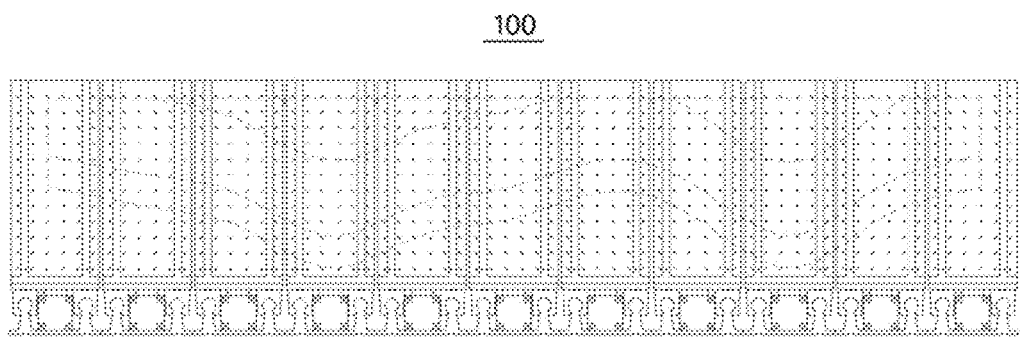
FIG. 9 describes a side view of the invention's automatic formwork system in the example of FIG. 7.
Figure 16:
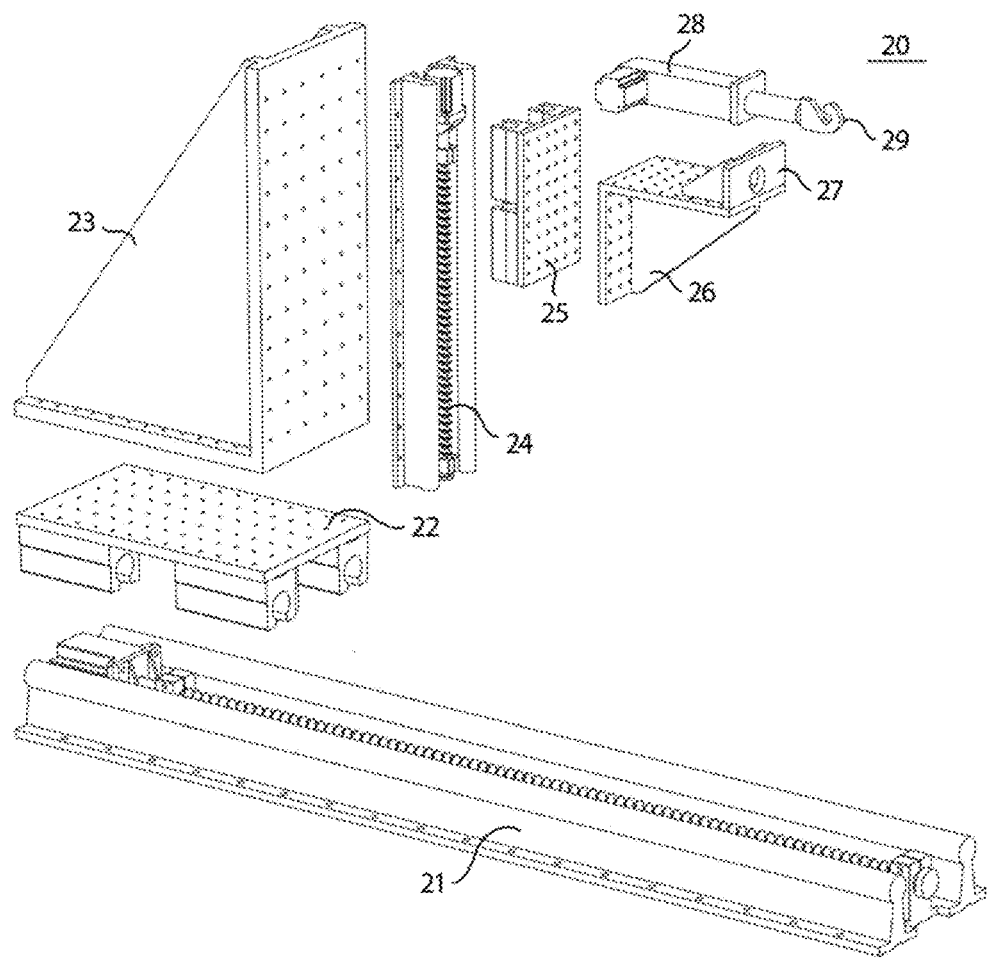
FIG. 16 describes an exploded traction unit of the invention's automatic formwork system.

The group of supporting modules (60) holds a flexible elastic membrane mold (10), as shown in FIG. 3, which may or may not be woven, and held by reinforced eyelets (11) distributed on both edges parallel to the mold's horizontal longitudinal axis, with hooks (29) located at the end of the stem of every second linear actuator (28) attached by a stop (27) to each traction unit (20) shown in detail in FIG. 16 and, optionally, internal flexible ropes, not shown, stitched or glued on both edges parallel to the mold's horizontal longitudinal axis. FIG. 3 shows the elastic membrane (10), which is previously deformed according to an approximation to the previous design of a part to be molded (50), as shown in FIGS. 7, 8 and 19 to 21, and prestressed according to the mathematical prediction of its deformation after receiving the conglomerate in liquid or plastic state. FIG. 7 shows the elastic membrane (10) loaded and deformed by the weight and pressure exerted by the conglomerate in liquid or plastic state, which is contained by the elastic membrane (10) itself and by two covers (51) vertically arranged at the most distant opposite ends of the part to be molded (50), which are partially detailed in FIGS. 7 and 8. The shape of each cover (51) follows the previous design of the part to be molded (50) and its position can be fixed to each transverse edge of the elastic membrane (10) in different ways such as, for example, between the projection (flange) formed by a rope previously sewn to each transverse edge of the elastic membrane (10) and the pressure exerted by the conglomerate against the cover (51), which can optionally include both holes to allow a group of reinforcement bars (52) to pass, as well as possibilities of fixing and prestressing the same bars, as shown in FIG. 8. The elastic membrane (10) and both covers (51) contain and shape the conglomerate in liquid or plastic state while hardening. FIG. 9 shows a side view of the automatic flexible mold formwork system (100), showing a plurality of supporting modules (60) adjacent to each other, arranged along a part to be molded (50). Each supporting module (60) can be anchored to the ground, in order to obtain greater resistance when pouring the conglomerate and tightening the flexible elastic membrane mold (10) in each cross section and supporting it throughout the length of the part to be molded (50). The traction (20) and thrust (30) units, which are components of the supporting module (60), can be conveniently spaced between them, as can be seen in FIG. 11 for the parts of the supporting module (60) of the automatic formwork (100) in an isometric view.

Figure 10A:
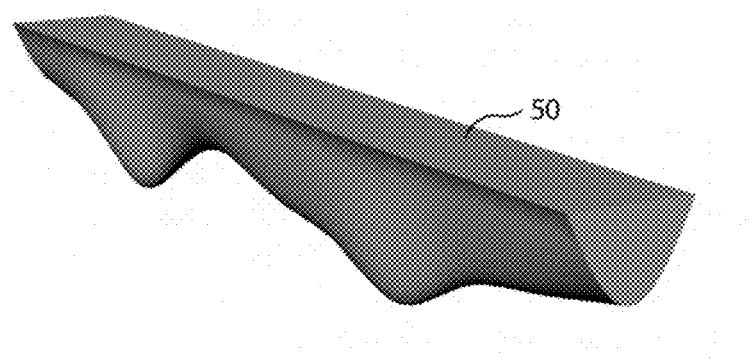
FIGS. 10a, 10b and 10c describe a molded part with two straight edges, obtained by the invention's automatic formwork system in one embodiment.
Figure 10B:
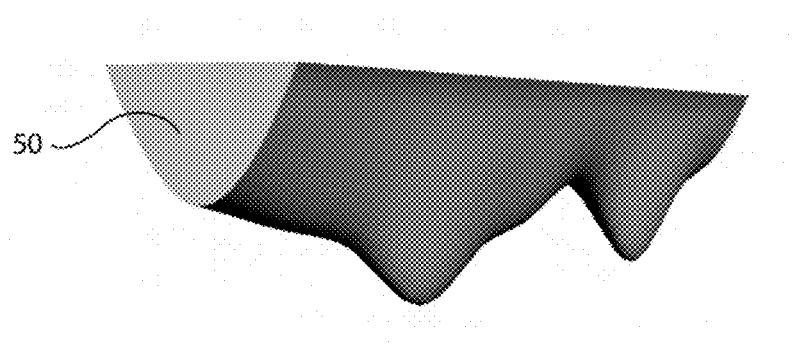
Figure 10C:
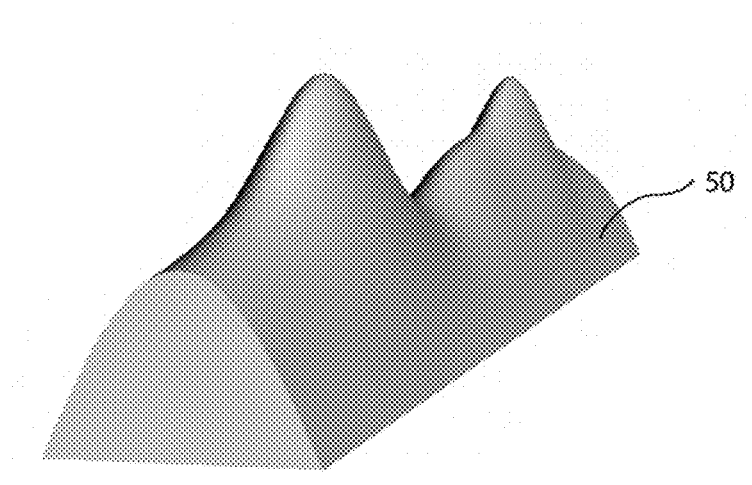

FIGS. 10a, 10b and 10c illustrate the sinuous shapes obtained in the lower part of the part to be molded (50), from the deformation of the elastic membrane (10), produced by the weight and pressure of the conglomerate, and controlled by the transverse stresses exerted by the traction units (20). At the top of the part to be molded (50) a rectangular flat surface is observed, which is the product of the combined action of the force of gravity on the conglomerate in the liquid or plastic state and the linear support provided by the group of thrust units (30) of each supporting module (60).

Figure 17:
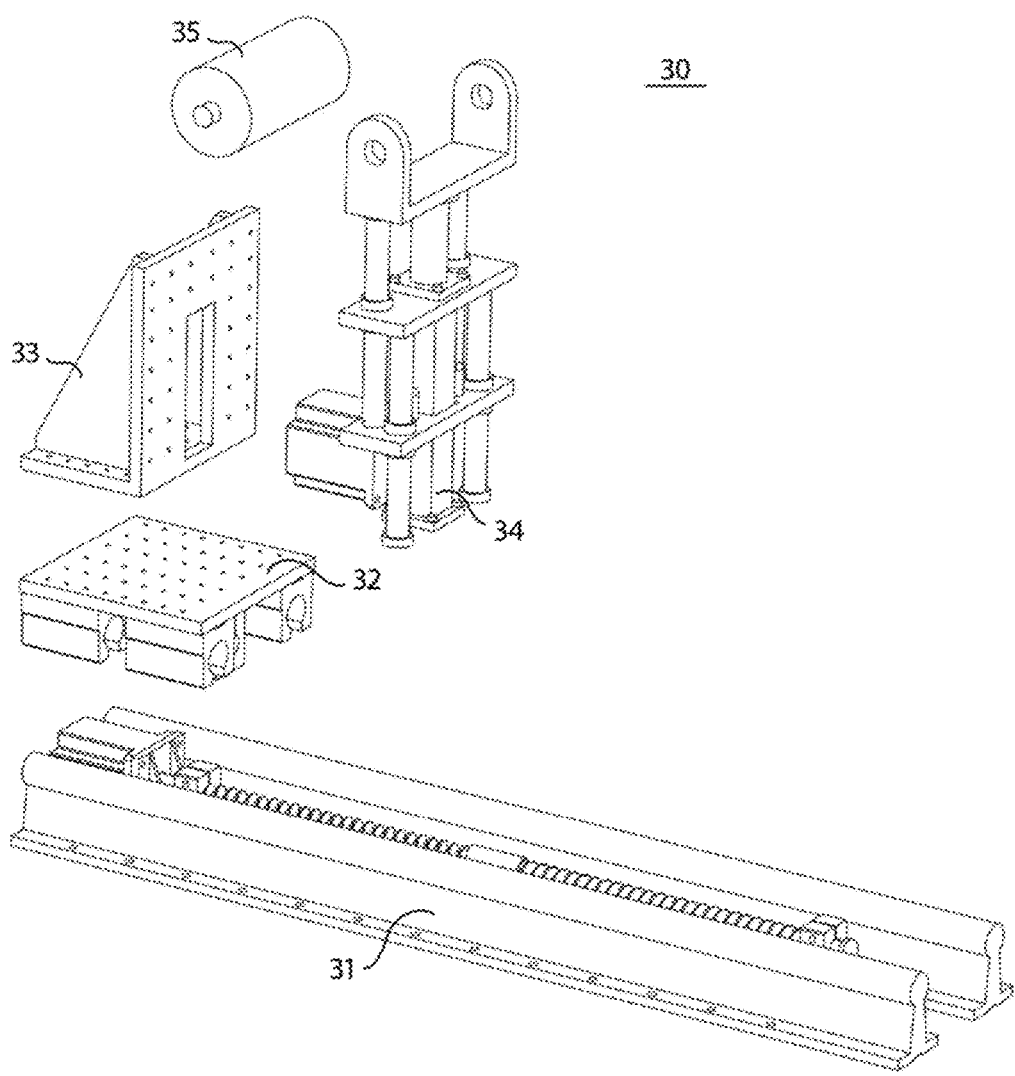
FIG. 17 shows an exploded thrust unit of the invention's automatic formwork system.
Figure 18:
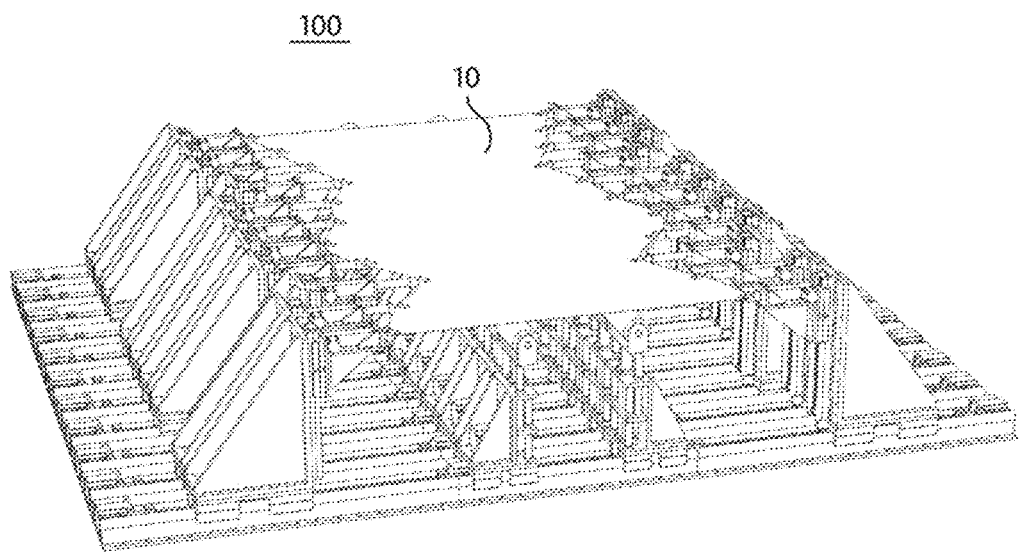
FIG. 18 describes a main isometric view of the invention's automatic formwork system at the beginning of the preparation of the flexible mold to mold a part.
Figure 19:
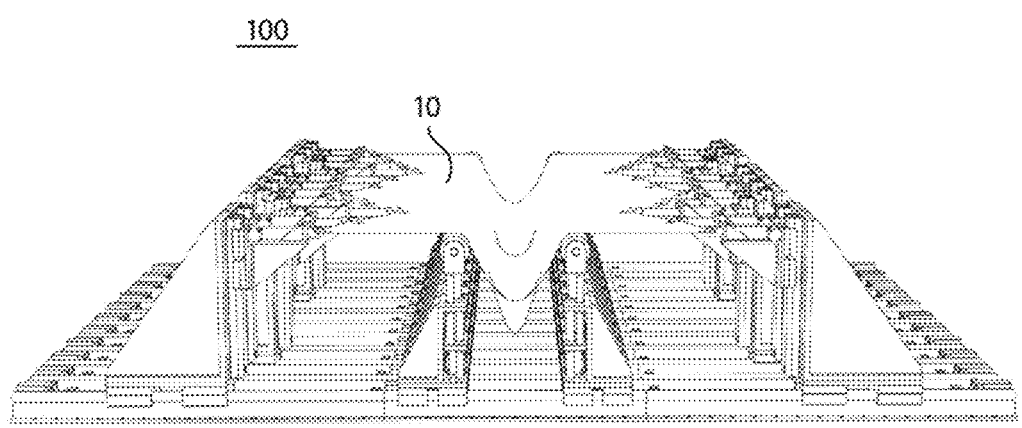
FIGS. 19 and 20 describe, as an example, main isometric views of the invention's automatic formwork system in different positions of the flexible mold ready to mold a part.
Figure 20:
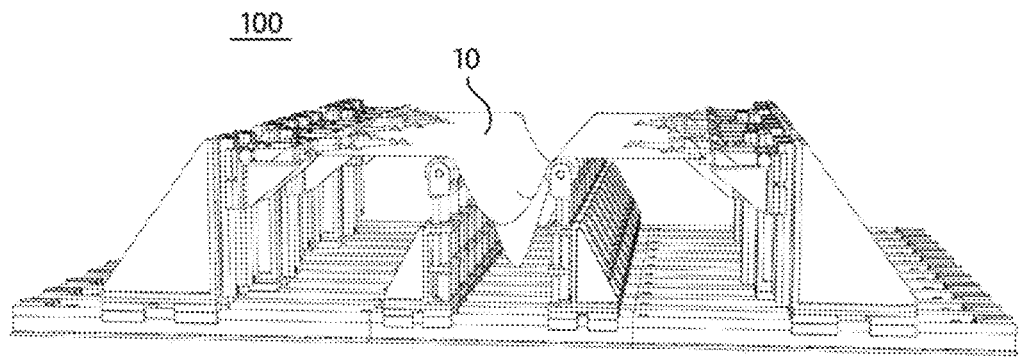

FIGS. 12 to 15 show the options for minimum and maximum extension in the vertical direction of the traction units (20) and the thrust units (30), as well as the minimum and maximum horizontal distance between the traction units (20) and between both lifting actuators (34) of the thrust unit (30). FIG. 16 is an exploded view of the parts of the traction unit (20); FIG. 17 is an exploded view of the parts of the thrust unit (30).

Each traction unit (20) consists of a first linear actuator (21) and the second linear actuator (28) horizontally arranged and a third linear actuator (24) vertically arranged, the three linear actuators (21, 24, 28) allowing movement in their respective positions, as shown in FIG. 16. On a horizontal sliding platform (22), which is operated by the first linear actuator (21), a vertical bracket (23) is mounted to support the third linear actuator (24), wherein a vertical sliding platform (25) is provided having a joint horizontal bracket (26) with the stop (27) on its horizontal face, in order to support the second linear actuator (28) arranged in a horizontal direction ending at the stem which has the hook (29) of each second linear actuator (28) mounted at its end. Both linear actuators (21, 24) are made up of a servomotor, stepper motor, or the like, optionally with hydraulic or pneumatic reinforcement, which drives a screw-nut, toothed belt, rack or other mechanism, for the linear displacement of a sliding platform, equipped with linear or similar bearings, on a group of guides or axes with continuous or discrete support rail, not shown. The second linear actuator (28) is composed of a servomotor, stepper motor, or the like, optionally with hydraulic or pneumatic reinforcement, which displaces the stem that has the hook (29) mounted on its end to pull the mold, not shown.

Each thrust unit (30), as shown in FIG. 17, is composed of a linear actuator (31) arranged in a horizontal direction and that supports the entire thrust unit (30); along each end of the thrust unit (30) there is a linear actuator (34) arranged in a vertical direction; on the linear actuator (31), at each end, a sliding platform (32) is located, said sliding platform (32) supporting a vertical bracket (33) that holds the linear actuator (34), with a roller (35) mounted at the end of said linear actuator (34). The linear actuator (31) is composed of a servomotor, stepper motor, or the like, optionally with hydraulic or pneumatic reinforcement, which drives a screw-nut mechanism with bidirectional thread or another, for the simultaneous linear movement towards the center or in opposite directions, of the sliding platforms (32) arranged at each end of the thrust unit (30), each of the sliding platforms (32) being equipped with linear bearings or the like, on a group of guides or axes with continuous or discrete support rail. Both linear actuators (34) are composed of a stem whose advancement mechanism can be electric, hydraulic, or pneumatic, in addition to a group of fixed guides and another of guides moving in vertical direction together with the stem and that at its end push a plate with two branches holding an axis that supports the roller (35).

Figure 21:
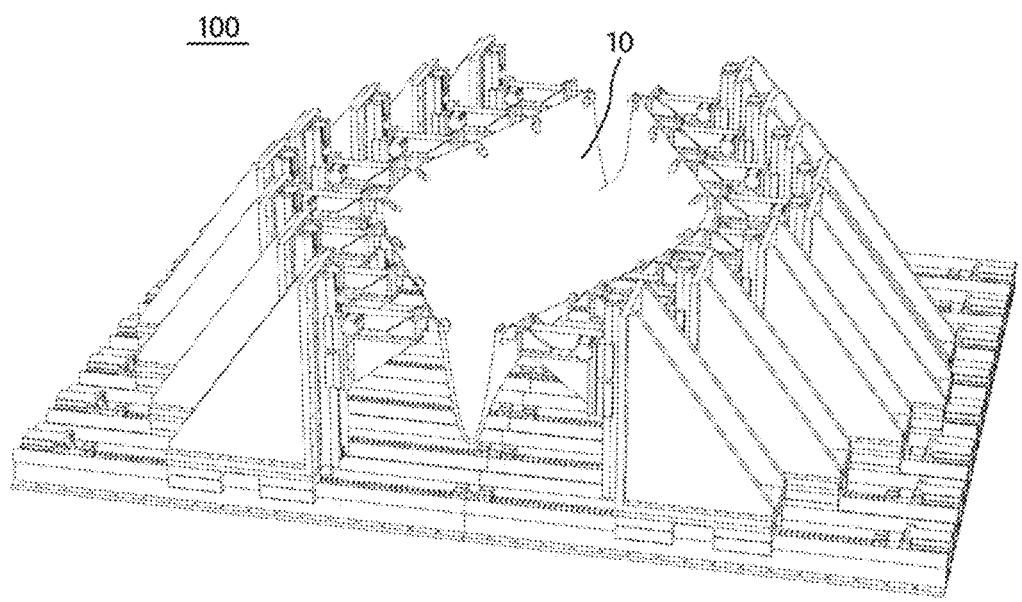
FIG. 21 describes a main isometric view of the invention's automatic formwork system in an alternative embodiment with the flexible mold ready to mold a part with sinuous edges.

Dispensing with the thrust unit (30), as shown in FIGS. 2 and 21, is possible, if the purpose is molding sinuous longitudinal edges on the top face of a part. Due to the different tensile forces exerted in the Y axis direction, the silhouette of both longitudinal edges of the flexible elastic membrane mold (10), when deformed by the weight and pressure of the conglomerate in liquid or plastic state, would acquire a sinuous shape. Separating each one of the units (20) and (30) from the supporting module (60) according to the width and height of the part to be molded (50) is also possible.

The automatic formwork system (100) allows at least three functionalities, the first being to prestress the elastic membrane (10) according to a numerical model that predicts the deformation of the elastic membrane (10) after receiving and containing the conglomerate. According to how the transverse tensile forces are distributed along the elastic membrane (10), prior to pouring the liquid conglomerate on it, the elastic membrane (10) will deform in one way or another. The functionality of prestressing the elastic membrane (10), according to a predictive mathematical model, is essential to mold a part of geometry defined in a previous design. The magnitudes of the transverse stresses calculated using the predictive numerical model for a given geometry, will vary depending on the stiffness and frame of the type of elastic membrane (10) used as a flexible mold to generate a part to be molded (50). In order to precisely control the applied voltages, a group of actuator-activated traction units (20) and thrust units (30), which in turn are controlled by a controller, hooks (29) and rollers (35) are automatically positioned in order to automatically transfer the parametric values obtained in the numerical model from the geometry defined in a previous design made in a CAD/CAM application program or similar.

In a second functionality, the tensile unit (20) can correct the transverse stresses from the measurement, using optical sensors, not shown, of the deformation of the elastic membrane (10) on each transverse axis Y. Once the liquid conglomerate is dumped in the elastic membrane (10), the optical sensors located at minimum height, below the part to be molded (50) and on the linear actuators (21, 31) either in the traction units (20) or in the thrust units (30) and, optionally, between units, measure the deformation of the elastic membrane (10) just above its position, and then calculate the difference between the real deformation and that defined according to the numerical model. The transverse stresses are modified according to the differences measured, thus proportionally increasing the stress where the real deformation is greater than the predefined one, and proportionally decreasing the stress where the actual deformation is less than the predefined one. This process is performed iteratively, until the differences between the real and the predefined deformation are not greater than a predefined tolerance factor. This iterative correction process is essential to obtain a satisfactory result, since although the deformation of the elastic membrane (10) can be predicted, various factors, such as the imprecision with which the elastic membrane (10) was manufactured, the real weight irregularly distributed of the fresh conglomerate or the possible deformation of the support will influence the final precision. Additionally, the possibility of measuring the differences between the deformations calculated using the numerical method and those actually obtained, allows improving the predictions of the numerical method by compensating the results obtained with the differences measured in previous tests.

In a third functionality, the automatic formwork system (100) can be used to remove the part to be molded (50). By increasing the transverse stresses along the elastic membrane (10), and separating the traction units (20) from each supporting module (60) as much as possible, detaching the elastic membrane (10) from the molded part (50) is possible. At the same time, it is possible to raise the molded part (50), which facilitates the maneuver to remove the molded part (50) from the automatic formwork system (100). Unlike the traditional formwork systems, wherein the removal of the supporting apparatus during the demolding process is necessary, in the automatic formwork system (100) it is only necessary to vary its physical configuration without having to remove it. This feature makes this automatic formwork system (100) an ideal system for industrially precasting parts of concrete or other types of conglomerate. Additionally, the possibility of easily removing the molded part (50) from the increase in transverse stresses allows to obtain a better finish of the molded part (50) and avoids the excessive use of chemical for the demolding process.

FIGS. 18 to 21 show some of the possible configurations that the automatic formwork system (100) can achieve with the elastic membrane (10) during its operation.

Description of the Operating System Method a) Provide in adjacent and aligned way, along the horizontal longitudinal axis, or X axis, of the part to be molded (50), a number of supporting modules (60) necessary to cover the total length of said part to be molded (50). Anchoring each of the traction and thrust units (20 and 30) that make up the supporting modules (60) is suggested, in an adjacent or conveniently spaced way in any of the X or Y directions, with a double purpose: first, to obtain greater resistance to the tensile and compressive forces to which the automatic formwork system (100) will be subjected during the molding of the part (50) and second, guaranteeing precision and repeatability in the physical configuration of the geometry of the flexible membrane mold elastic (10) during the molding process of the part (50). The required number of supporting modules (60) can be determined by dividing the total length of the part to be molded (50) by the width of each supporting module (60). The position of the covers (51) of the mold is independent of the position of the last supporting module (60), so that it is not strictly necessary that the length of the part to be molded (50) and the sum of all the adjoining supporting modules (60) exactly match; optionally there may be a lateral distance between each supporting module (60), that is, in the direction of the X axis. If the design of the part to be molded (50) does not consider straight longitudinal edges, then it is possible to dispense with the thrust units (30) and bring the traction units (20)

closer to each other in a predetermined way, that is, in the direction of the horizontal cross axis of the mold, or Y axis.

b) Distance the pair of linear actuators (34) each other from each thrust unit (30), until reaching the minimum distance required according to the maximum width of the part to be molded (50) and the predictive numerical model, taking take into account the maximum transverse stress applied to the elastic membrane (10). The position on the Y axis of each linear actuator (34) is symmetrical with respect to the X axis. The numerically controlled linear actuator (31) allows the simultaneous horizontal movement of both sliding platforms (32) to be synchronized towards the center or towards the ends accurately.

c) Raise the pair of rollers (35) of each thrust unit (30), until reaching the minimum height required according to the maximum height of the part to be molded (50) and the predictive numerical model, taking into account the maximum transverse stress applied to the elastic membrane (10). The position on the Z axis of each roller (35) is the same. The pair of numerically controlled linear actuators (34) allows the simultaneous vertical movement of both rollers (35) upwards and downwards precisely.

d) Raise all the hooks (29) of each traction unit (20), until reaching the same height as the rollers (35), this corresponding to the minimum height required according to the maximum height of the part to be molded (50) and the predictive numerical model, taking into account the maximum transverse stress applied to the elastic membrane (10). A numerically controlled linear actuator (24) allows the vertical movement of the hook (29) upwards and downwards to be precisely synchronized in each traction unit (20).

e) Bring all the traction units (20) facing each other in each supporting module (60), with their hooks (29) in maximum horizontal extension, until reaching a preset convenient distance that allows the reinforced eyelets (11) of the flexible elastic membrane mold (10) to be engaged in its entire length according to the length of the part to be molded (50) as such.

f) Once the flexible elastic membrane mold (10) is engaged on its two longitudinal edges, distance the linear actuators (24) from each pair of traction units (20) facing in each supporting module (60), prestressing the flexible elastic membrane mold (10) and get as close as possible to the shape predicted by the previous numerical model.

The position on the Y axis of the linear actuators (24) of each pair of facing traction units (20) is symmetrical with respect to the X axis of the mold. A numerically controlled linear actuator (21) allows the horizontal forward and backward movement of each of the linear actuators (24) to be precisely synchronized, on which the linear actuators (28) are finally mounted, at which stem ends each hook (29) is mounted.

g) Before pouring the conglomerate, install inside the mold (10) the iron or steel bar reinforcement as necessary and the covers (51) on both ends of the mold (10), in order to contain the conglomerate while it hardens.

h) Once the process of prestressing the elastic membrane (10) and the optional installation of reinforcement are completed, the mixture of conglomerate in liquid or plastic state is poured onto the elastic membrane (10) until reaching the filling level predefined.

i) From the initial deformation of the elastic membrane (10) and in the period during which the conglomerate is still in liquid or plastic state, the difference between the real and the predefined theoretical deformation is measured in order to modify the transverse stresses and thus correct the measured difference. This process is performed iteratively until a measured difference less than a predefined tolerance is reached. A plurality of optical sensors, not shown, installed on each supporting module (60), above the linear actuators (21, 31) and below the part to be molded (50), allow the deformation in each section of the elastic membrane (10) loaded with the conglomerate to be measured in real time. In a general purpose computer, the difference between the real deformation and that defined by the predictive numerical model built for the original design of the part to be molded (50) is compared. A conventional CAM application allows to generate the numerical control files that a controller such as, for example, a programmable logic controller uses to drive the linear actuators (28) that finally allow to precisely modify the transverse stresses exerted on the elastic membrane (10), rectifying the mold geometry in order to approximate the original design. This process is repeated until the differences between the actual and theoretical deformation are no greater than a predefined tolerance factor. This process is essential, since predicting with certainty the real deformation of the elastic membrane (10) in each embodiment of a molding part (50) is impossible.

j) Once the shape of the mold (50) has stabilized, the motors can be turned off, since the position of the actuators is mechanically locked while the molding part (50) gradually hardens.

k) Once the molded part (50) has cured, the stress is increased in all its cross sections, thus facilitating the detachment of the elastic membrane (10) from the molded part (50), while being lifted and removed from the automatic formwork system (100).

APPLICATION EXAMPLE

In a first application example, in order to mold a beam of complex geometry, with straight longitudinal edges, composed of M15 quality mortar, with a resistance of 150 Kp/cm$^2$, whose dimensions are 2.5 meters long, 30 centimeters wide, a maximum height of 40 centimeters and a minimum height of 15 centimeters, 11 adjoining supporting modules (60) are anchored to the ground along the longitudinal axis of the part to be molded (50), such that the sum of its widths is greater than or equal to the total length of the part to be molded (50), which in this case is 2.5 meters. Next, the linear actuators (31) of each of the thrust units (30) are actuated to position each of their linear actuators (34) at a proper distance to the maximum width of the part to be molded (50), which in this case is 30 centimeters. Then, both are actuated: the linear actuators (34) to raise the rollers (35) and the linear actuators (24) to raise the hooks (29) to the same height, until reaching a proper height to the maximum height of the part to be molded (50), which in this case is 40 centimeters. The linear actuators (21) of the traction units (20) are then actuated to bring the hooks (29), fully extended, closer to the longitudinal central axis of the automatic formwork system (100) and engage the flexible mold (10) in all its reinforced eyelets (11). The linear actuators (21) are then actuated again, this time moving backwards, in order to prestress the flexible mold (10), without retracting the stems of the linear actuators (28) yet with the hooks (29) mounted at their ends. A reinforcement of iron bars and stirrups are installed inside the mold (10). Immediately, the covers (51) are installed, taking advantage of the projection that forms the rope that was previously sewn at both ends of the flexible mold (10) and of the pressure that the conglomerate will exert against it. The covers are provided with holes that allow the bars of the reinforcement to pass through them and can be prestressed and fixed in position, using conventional devices. Next, the mixture of conglomerate in liquid or plastic state is poured on the elastic membrane (10) until reaching the predefined level of liquid. From the initial deformation of the elastic membrane (10) and during the period when the conglomerate is still in liquid or plastic state, the difference between the real and pre-calculated deformation is measured with optical sensors, in order to modify the transverse stress of the mold (10). Consequently, the automatic formwork system (100) acts in a coordinated and synchronized manner on each one of the linear actuators (28) in order to pull the mold (10) or release it until approaching the shape of the original design of the part to be molded (50). This process is performed iteratively until reaching a measured difference less than a predefined tolerance.

In a second application example, in order to mold a sculptural part of complex geometry with sinuous longitudinal edges, composed of M5 quality mortar, whose dimensions are 1.7 meters long, 1 meter wide, a maximum deformation of 35 centimeters and a minimum deformation of 15 centimeters, 8 pairs of traction units (20) are arranged facing each other, along the X axis so that the sum of their widths is greater than or equal to the total length of the part to be molded (50), which in this case is 1.7 meters. The height at which the hooks (29) are positioned is determined by the maximum deformation calculated for the elastic membrane (10). The horizontal distance between the tensile units (20) depends on the minimum deformation calculated. To this effect, the linear actuators (21) of the traction units (20) are actuated. Once the linear actuators (24) of each traction unit (20) have been positioned, the linear actuators (28) are positioned with their respective hooks (29). Once all the hooks (29) have been displaced, the elastic membrane (10) is fastened to them, using the reinforced eyelets (11) previously provided. Once the elastic membrane (10) is engaged to the traction units (20), the elastic membrane (10) is prestressed by displacing the linear actuators (21) according to the stresses determined in the predictive numerical model. Once the prestressing process is completed, the required reinforcement is installed and the fresh conglomerate mixture is poured onto the elastic membrane (10). From the initial deformation of the elastic membrane (10) and during the period when the conglomerate is still in liquid or plastic state, the difference between the real and the predefined deformation is measured in order to modify the transverse stresses and thus correct the difference measured. This process is performed iteratively until a measured difference less than a predefined tolerance is reached. Once the molded part (50) is cured, the stress is increased in all the transverse axes, thus achieving the detachment of the membrane from the molded part (50). It is evident that the examples given do not limit the invention, since making other types of molded parts (50) is possible within the parameters and criteria already described.

The invention claimed is:

1. An automatic formwork system (100) using flexible molds, comprising:
   an elastic membrane (10) supported by a plurality of supporting modules (60), arranged side by side, along a horizontal longitudinal axis or X axis of a flexible mold or part to be molded (50);
   wherein each supporting module (60) is composed of a first traction unit (20) forming a group with a first thrust unit (30) and a second traction unit (20) forming a group with a second thrust unit (30), wherein both groups are arranged opposite each other and at a preset convenient distance;
   wherein each pair of traction units (20) are arranged opposite each other in a direction perpendicular to the X axis and between them they are arranged with their respective thrust units (30);
   wherein the group of supporting modules (60) holds an elastic membrane (10) with the flexible mold (50), which is held by reinforced eyelets (11) distributed on both edges parallel to the horizontal longitudinal axis of the flexible mold (50);
   wherein each of the traction units (20) is composed of a first linear actuator (21) and a second linear actuator (28) horizontally arranged and a third linear actuator (24) vertically arranged, the three linear actuators (21, 24, 28) enabling movement in their respective positions on a horizontal sliding platform (22); and
   wherein the elastic membrane (10) is previously deformed according to an approximation to the previous design of a part to be molded (50), and prestressed according to a mathematical prediction of its deformation after receiving a conglomerate in liquid or plastic state.

2. The automatic formwork system (100) according to claim 1, wherein the supporting module (60) is provided in a first option of minimum extension in the vertical and horizontal direction of the traction (20) and thrust (30) units.

3. The automatic formwork system (100) according to claim 1, wherein the supporting module (60) is provided in a second option of maximum and minimum extension in the vertical and horizontal direction, respectively, of the traction (20) and thrust (30) units.

4. The automatic formwork system (100) according to claim 1, wherein the supporting module (60) is provided in a third option of maximum and minimum extension in the vertical and horizontal direction, respectively, of the traction (20) and thrust (30) units.

5. The automatic formwork system (100) according to claim 1, wherein the supporting module (60) is provided in a forth option of maximum and minimum extension in the vertical and horizontal direction, respectively, of the traction (20) and thrust (30) units.

6. The automatic formwork system (100) according to claim 1, wherein the elastic membrane (10) can be woven or not.

7. The automatic formwork system (100) according to claim 1, wherein, on the horizontal sliding platform (22), which is operated by the first linear actuator (21), a vertical bracket (23) is mounted to support the third linear actuator (24), wherein a vertical sliding platform (25) is provided having a joint horizontal bracket (26) with a stop (27) on its horizontal face, in order to hold the second linear actuator (28) arranged in a horizontal direction ending at a stem which has a hook (29) of each second linear actuator (28) mounted at its end.

8. The automatic formwork system (100) according to claim 7, wherein the linear actuators (21, 24) are made up of a servomotor or stepper motor, optionally with hydraulic or pneumatic reinforcement, which drives a screw-nut, toothed belt, rack or other mechanism, for the linear displacement of a sliding platform, equipped with linear bearings, on a group of guides or axes with continuous or discrete support rail.

9. The automatic formwork system (100) according to claim 8, wherein the linear actuator (28) is made up of a servomotor or stepper motor, optionally with hydraulic or pneumatic reinforcement, which displaces the stem having the hook (29) mounted at its end, so that to pull the flexible mold (50).

10. The automatic formwork system (100) according to claim 1, wherein each thrust unit (30) is made up by a linear actuator (31) arranged in horizontal direction and supporting the thrust unit (30) lengthwise; at each end of the thrust unit (30) there is a linear actuator (34) arranged in vertical direction: on the linear actuator (31), at each end, there is a sliding platform (32), said sliding platform (32) supporting a vertical bracket (33) that holds the linear actuator (34) with a roller mounted at the end of said linear actuator (34).

11. The automatic formwork system (100) according to claim 10, wherein the linear actuator (31) is composed of a servomotor or stepper motor, optionally with hydraulic or pneumatic reinforcement, which drives a screw-nut mechanism with bidirectional thread or another, for the simultaneous linear movement towards the center or in opposite directions, of the sliding platforms (32) arranged at each end of the thrust unit (30), each of the sliding platforms (32) being equipped with linear bearings, on a group of guides or axes with continuous or discrete support rail.

12. The automatic formwork system (100) according to claim 11, wherein both linear actuators (34) are composed of a stem whose advancement mechanism can be electric, hydraulic, or pneumatic, in addition to a group of fixed guides and another of guides that move in a vertical direction along with the stem and which in its upper end pushes a plate with two branches holding an axis that supports the roller (35).

13. The automatic formwork system (100) according to claim 1, wherein the elastic membrane (10) loaded and deformed by the weight and pressure exerted by the conglomerate in liquid or plastic state, which is contained by the elastic membrane (10) itself, has two covers (51) vertically arranged at the most distant opposite ends of the part to be molded (50).

14. The automatic formwork system (100) according to claim 13, wherein the shape of each cover (51) follows the previous design of the part to be molded (50) and its position can be fixed to each transverse edge of the elastic membrane (10) in different ways between the projection (flange) formed by a rope previously sewn to each transverse edge of the elastic membrane (10) and the pressure exerted by the conglomerate against the cover (51), which can optionally include both holes to allow a group of reinforcement bars (52) to pass, as well as possibilities of fixing and prestressing the same bars.

15. A method for automatic formwork (100) using flexible molds, implemented in an automatic formwork system (100) using flexible molds, comprising:
  an elastic membrane (10) supported by a plurality of supporting modules (60), arranged side by side, along a horizontal longitudinal axis or X axis of a flexible mold or part to be molded (50);
  wherein each supporting module (60) is composed of a first traction unit (20) forming a group with a first thrust unit (30) and a second traction unit (20) forming a group with a second thrust unit (30), wherein both groups are arranged opposite each other and at a preset convenient distance;
  wherein each pair of traction units (20) are arranged opposite each other in a direction perpendicular to the X axis and between them they are arranged with their respective thrust units (30);
  wherein the group of supporting modules (60) holds an elastic membrane (10) with the flexible mold (50), which is held by reinforced eyelets (11) distributed on both edges parallel to the horizontal longitudinal axis of the flexible mold (50);
  wherein each of the traction units (20) is composed of a first linear actuator (21) and a second linear actuator (28) horizontally arranged and a third linear actuator (24) vertically arranged, the three linear actuators (21, 24, 28) enabling movement in their respective positions on a horizontal sliding platform (22); and
  wherein the elastic membrane (10) is previously deformed according to an approximation to the previous design of a part to be molded (50), and prestressed according to a mathematical prediction of its deformation after receiving a conglomerate in liquid or plastic state;
  the method comprising the steps of:
  distancing a pair of linear actuators (34) each other from each thrust unit (30), until reaching the minimum necessary distance according to the maximum width of the part to be molded (50) and a predictive numerical model, taking into account the maximum transverse stress applied to the elastic membrane (10);
  raising a pair of rollers (35) of each thrust unit, until reaching the minimum necessary height according to the maximum height of the part to be molded (50) and the predictive numerical model, taking into account the maximum transverse stress applied to the elastic membrane (10);
  raising a hook (29) of each traction unit (20), until reaching the same height as the rollers (35), which corresponds to the minimum necessary height according to the maximum height of the part to be molded (50) and the predictive numerical model, taking into account the transverse maximum stress applied to the elastic membrane (10);
  bringing all the facing traction units (20) in each supporting module (60) together, with each hook (29) in maximum horizontal extension, until reaching a preset convenient distance that allows the reinforced eyelets (11) of the elastic membrane (10) to be engaged along their entire length according to the length of the part to be molded (50) itself;
  once the flexible elastic membrane mold (10) has been engaged on its two longitudinal edges, distancing the linear actuators pair (24) each other from each pair of facing traction units (20) in each supporting module (60), prestressing the flexible elastic membrane mold (10) and approaching as much as possible the shape predicted by the previous numerical model;
  once the process of prestressing the elastic membrane (10) and the optional installation of reinforcement is completed, pouring the mix of liquid or plastic conglomerate onto the elastic membrane (10) until reaching the predefined filling level;
  from the initial deformation of the elastic membrane (10) and in the period during which the conglomerate is still in liquid or plastic state, measuring the difference between the real and the predefined theoretical deformation to modify the transverse stresses and thus correct the difference measured; and wherein this process is repeatedly carried out until reaching a measured difference lower than a predefined tolerance; and
  once the molded part (50) is cured, the stress is increased in all its cross sections, thus facilitating the detachment of the elastic membrane (10) from the molded part (50), while being lifted and removed from the automatic formwork system (100).

16. The method for an automatic formwork (100) according to claim 15, wherein the position on the Y axis of each linear actuator (34) is symmetrical with respect to the X axis and the numerically controlled linear actuator (31) allows the simultaneous horizontal movement of both sliding platforms (32) to be synchronized towards the center or towards the ends accurately.

17. The method for an automatic formwork (100) according to claim 15, wherein the position on the Z axis of each roller (35) is the same and the pair of numerically controlled linear actuators (34) allow the simultaneous vertical movement of both rollers (35) upwards and downwards precisely.

18. The method for an automatic formwork (100) according to claim 15, wherein a numerically controlled linear actuator (24) allows the vertical movement of the hook (29) upwards and downwards to be precisely synchronized in each traction unit (20).

19. The method for an automatic formwork (100) according to claim 15, wherein the position on the Y axis of the linear actuators (24) of each pair of facing traction units (20) is symmetrical with respect to the X axis of the mold; and a numerically controlled linear actuator (21) allows the horizontal forward and backward movement of each of the linear actuators (24) to be precisely synchronized, on which the linear actuators (28) are finally mounted, at which stem ends each hook (29) is mounted.

20. The method for an automatic formwork (100) according to claim 15, wherein, before pouring the conglomerate, it further comprises installing inside the elastic membrane (10) an iron or steel bar reinforcement as necessary and covers (51) on both ends of the elastic membrane (10), in order to contain the conglomerate while it hardens.

21. The method for an automatic formwork (100) according to claim 15, wherein a plurality of optical sensors installed on each supporting module (60), above the linear actuators (21, 31) and below the part to be molded (50), allow the deformation in each section of the elastic membrane (10) loaded with the conglomerate to be measured in real time;

and in a general purpose computer, the difference between the real deformation and that defined by the predictive numerical model built for the original design of the part to be molded (50) is compared.

\* \* \* \* \*